(12) United States Patent
Matsuura

(10) Patent No.: US 12,151,683 B2
(45) Date of Patent: Nov. 26, 2024

(54) VEHICLE CONTROL SYSTEM

(71) Applicant: SUBARU CORPORATION, Tokyo (JP)

(72) Inventor: Munenori Matsuura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

(21) Appl. No.: 16/934,765

(22) Filed: Jul. 21, 2020

(65) Prior Publication Data

US 2021/0086772 A1 Mar. 25, 2021

(30) Foreign Application Priority Data

Sep. 25, 2019 (JP) .................................. 2019-174718

(51) Int. Cl.
*B60W 30/18* (2012.01)
*B60W 10/04* (2006.01)
*B60W 50/14* (2020.01)

(52) U.S. Cl.
CPC ...... *B60W 30/18027* (2013.01); *B60W 10/04* (2013.01); *B60W 50/14* (2013.01);
(Continued)

(58) Field of Classification Search
CPC ........... B60W 30/18027; B60W 10/04; B60W 50/14; B60W 2540/223; B60W 2420/42; B60W 2520/105
See application file for complete search history.

(56) References Cited

U.S. PATENT DOCUMENTS

2010/0030434 A1* 2/2010 Okabe .................... B60K 28/06
 719/327
2014/0025267 A1 1/2014 Tezuka et al.
(Continued)

FOREIGN PATENT DOCUMENTS

JP 2012-091739 A 5/2012
JP 2014-019295 A 2/2014
(Continued)

OTHER PUBLICATIONS

Office Action issued in corresponding Japanese Patent Application No. 2019-174718 dated May 9, 2023, with English translation.

*Primary Examiner* — Jelani A Smith
*Assistant Examiner* — Toya Pettiegrew
(74) *Attorney, Agent, or Firm* — Rimon P.C.

(57) ABSTRACT

A vehicle control system includes a traveling environment detector configured to detect a traveling environment in a traveling direction of a vehicle, an acceleration state detector configured to detect an acceleration state due to a driver's operation, a driver state monitor configured to monitor a state of a driver based on a captured driver's image and detect an expression centered on the driver's face, an expression sudden change determinator configured to determine a sudden change in the driver's expression based on a detection result by the driver state monitor, an acceleration suppressor configured to suppress acceleration of the vehicle when the traveling environment detector detects no object for which collision avoidance is required in the traveling direction of the vehicle and the expression sudden change determinator determines that the driver's expression has suddenly changed immediately after the acceleration state detector detects the rapid acceleration due to the driver's operation.

5 Claims, 3 Drawing Sheets

(52) U.S. Cl.
CPC .  *B60W 2050/143* (2013.01); *B60W 2420/403* (2013.01); *B60W 2520/105* (2013.01); *B60W 2540/223* (2020.02)

(56) References Cited

U.S. PATENT DOCUMENTS

| | | | |
|---|---|---|---|
| 2016/0194000 A1* | 7/2016 | Taki | B60W 30/08 |
| | | | 701/70 |
| 2016/0221437 A1* | 8/2016 | Takegawa | B60K 26/021 |
| 2016/0231746 A1* | 8/2016 | Hazelton | G05D 1/0274 |
| 2019/0056732 A1* | 2/2019 | Aoi | B60W 50/082 |
| 2020/0226930 A1* | 7/2020 | Shimbo | G06V 20/58 |
| 2020/0234191 A1* | 7/2020 | Murahashi | G07C 5/0841 |
| 2020/0283021 A1* | 9/2020 | Horii | B60W 30/18109 |
| 2021/0004619 A1* | 1/2021 | Qin | G06V 10/454 |
| 2022/0219684 A1* | 7/2022 | Shimizu | B60T 8/1755 |

FOREIGN PATENT DOCUMENTS

| | | |
|---|---|---|
| JP | 2014-041450 A | 3/2014 |
| JP | 5550629 B2 | 7/2014 |
| JP | 6075575 B2 | 2/2017 |

* cited by examiner

VEHICLE CONTROL SYSTEM

CROSS-REFERENCE TO RELATED APPLICATIONS

The present application claims priority from Japanese Patent Application No. 2019-174718 filed on Sep. 25, 2019, the entire contents of which are hereby incorporated by reference.

BACKGROUND

The technology relates to a vehicle control system configured to suppress acceleration of a vehicle due to a driver's erroneous operation.

In vehicles such as automobiles, there have been proposed various techniques to suppress acceleration of a vehicle and secure safety when a driver performs an erroneous operation such as a wrong step on an accelerator pedal instead of a brake pedal or the like at a time of starting or traveling a vehicle.

For example, Japanese Patent No. 5550629 proposes a technique in which when a distance to an obstacle in a traveling direction of an own vehicle is detected and the detected distance is within a predetermined distance, in a case where an increase in an accelerator opening is detected, control for suppressing output torque of an engine is started to prohibit rapid movement of the own vehicle.

Japanese Patent No. 6075575 proposes a technique in which when it is determined that there is a front obstacle based on an image captured by a monocular camera on an uphill road, a driving force generated by a power source is suppressed to a driving force that is smaller than a required driving force but does not cause a vehicle to move back.

SUMMARY

An aspect of the technology provides a vehicle control system to be installed in a vehicle. The vehicle control system includes a traveling environment detector, an acceleration state detector, a driver state monitor, an expression sudden change determinator, and an acceleration suppressor. The traveling environment detector is configured to detect a traveling environment in a traveling direction of the vehicle. The acceleration state detector is configured to detect an acceleration state due to a driver's operation. The driver state monitor is configured to monitor a state of a driver on a basis of a captured driver's image and detect an expression centered on the driver's face. The expression sudden change determinator is configured to determine a sudden change of the driver's expression on a basis of a detection result by the driver state monitor. The acceleration suppressor is configured to suppress acceleration of the vehicle when the traveling environment detector does not detect an object for which collision avoidance is required in the traveling direction of the own vehicle and the expression sudden change determinator determines that the driver's expression has suddenly changed immediately after detection of the rapid acceleration due to the driver's operation by the acceleration state detector.

An aspect of the technology provides a vehicle control system to be installed in a vehicle. The vehicle control system includes a traveling environment detector and circuitry. The traveling environment detector is configured to detect a traveling environment in a traveling direction of the vehicle. The circuitry is configured to detect an acceleration state due to a driver's operation. The circuitry configured to monitor a state of a driver on a basis of a captured driver's image and detect an expression centered on the driver's face. The circuitry is configured to determine a sudden change in the driver's expression on a basis of a detection result of detecting the expression. The circuitry is configured to suppress acceleration of the vehicle when t an object for which collision avoidance is required is not detected in the traveling direction of own vehicle and it is determined that the driver's expression has suddenly changed immediately after detection of the rapid acceleration due to the driver's operation.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

The conventional techniques disclosed in Japanese Patent No. 5550629 and Japanese Patent No. 6075575 are based on a premise that an obstacle is present in the front, and it can be said to be control at a stage prior to collision avoidance control for avoiding a collision with an obstacle. Therefore, in a case where no obstacle is recognized in a traveling direction of a vehicle, for example, in a case where the vehicle is stopped facing the sea or river, or in a case where the vehicle is stopped in front of a cliff or the like, when a driver erroneously operates an accelerator, it is not possible to suppress rapid acceleration of the vehicle and it is difficult to secure safety.

The technology has been made in view of the above circumstances, and it is desirable to provide a vehicle control system capable of suppressing rapid acceleration of an own vehicle due to a driver's erroneous operation and securing safety by avoiding an accident occurrence beforehand even when no obstacle is recognized in the traveling direction of the own vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
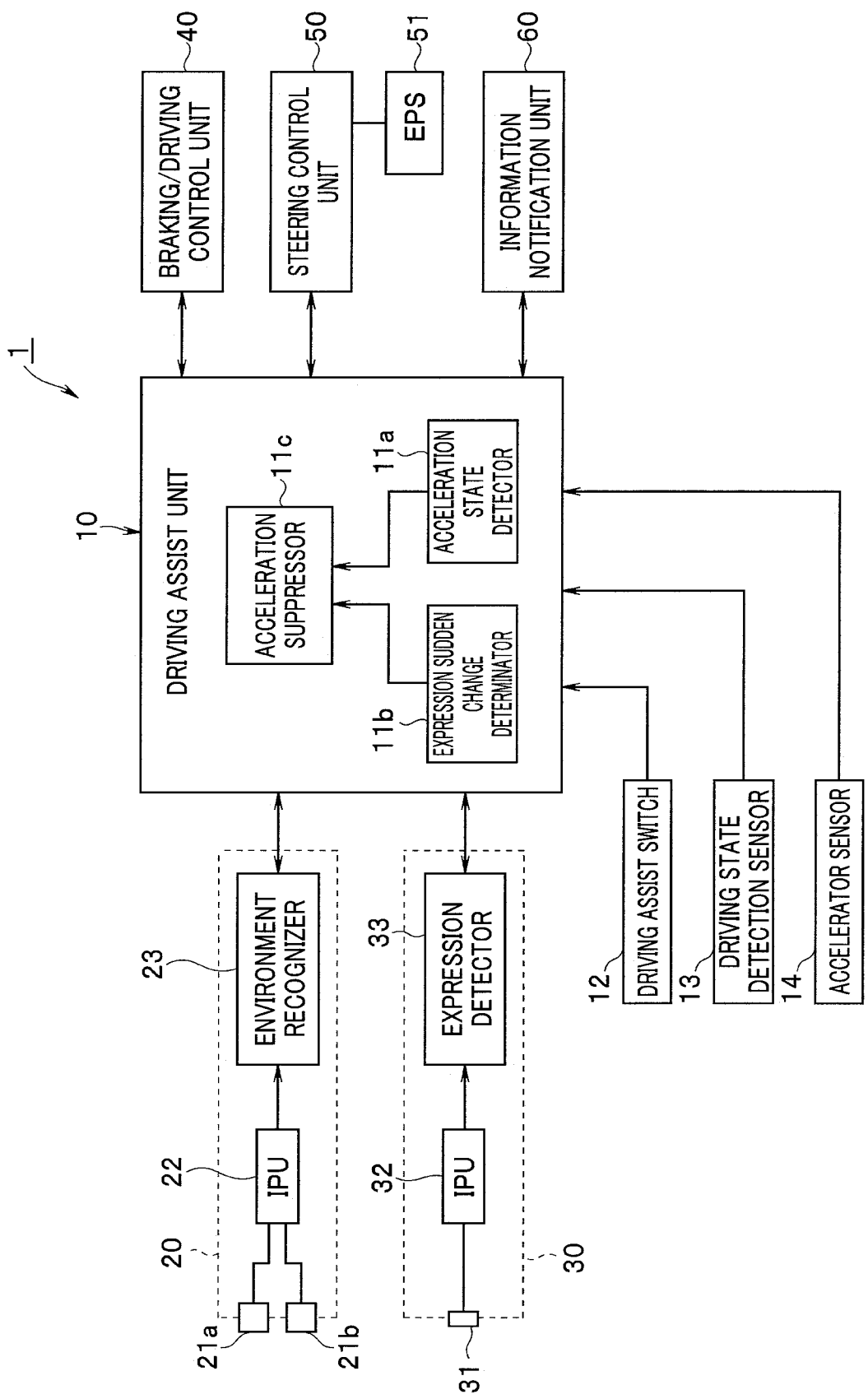
FIG. 1 is a schematic configuration diagram of a vehicle control system.

FIG. 1 is a schematic configuration diagram of a vehicle control system. In the embodiment, a vehicle control system 1 illustrated in FIG. 1, is to be mounted on a vehicle, and includes a driving assist unit 10 as a main unit configured to support a driver's driving operation.

The vehicle control system 1 includes the driving assist unit 10, a camera unit 20, a driver monitoring system 30 for monitoring a driver's state, a braking/driving control unit 40, a steering control unit 50, and an information notification unit 60. The units and the system, each includes a computer having a single or multiple processors and a computer system having peripheral devices thereof, and is communicably coupled to one another via an in-vehicle network. In one embodiment, the camera unit 20 and the driver monitoring system 30 may serve as a "traveling environment detector" and a "traveling environment detector" respectively.

To the driving assist unit 10, a driving assist switch 12, a driving state detection sensor 13, and an accelerator sensor 14 are coupled. The driving assist switch 12 is a switch that is turned on when a driver desires driving assist traveling. The driving state detection sensor 13 detects a driving state of the vehicle (vehicle speed, longitudinal acceleration, steering angle, yaw rate, etc.), and is a general term for sensors configured to detect the driving state of the own vehicle such as a vehicle speed sensor, an acceleration sensor, a steering angle sensor, a yaw rate sensor, and the like. The accelerator sensor 14 is a sensor that detects, as an accelerator opening, a depression amount on an accelerator pedal P (see FIG. 2) by a driver.

The camera unit 20 is fixed to the upper center of a front portion of a cabin of the own vehicle, and includes an on-vehicle camera (stereo camera) configured with a main camera 21a and a sub camera 21b disposed symmetrically with respect to the center in a vehicle width direction, an image processing unit (IPU) 22, and an environment recognizer 23.

Both the cameras 21a and 21b have respectively built-in image sensors such as CCDs, CMOSs, or the like, and capture images of a traveling environment ahead of the own vehicle with different view points, that is, a parallax. Thus, a reference image (main image) and a comparison image (sub image) required for performing stereo image processing are acquired. Image signals of the traveling environment ahead of the own vehicle captured by both the cameras 21a and 21b are transmitted to the IPU 22, subjected to predetermined image processing, and then transmitted to the environment recognizer 23.

The environment recognizer 23 performs matching processing on the reference image based on the captured image of the main camera 21a and the comparison image based on the captured image of the sub camera 21b, to obtain a pixel shift amount (parallax) at corresponding positions between both the images, and converts the pixel shift amount into luminance data or the like to generate a distance image. Points on the distance image are coordinate-converted into points in the actual space centered on the own vehicle based on the principle of triangulation, and lane lines (lane) on a road on which the own vehicle travels, a three-dimensional object existing in the traveling direction of the own vehicle, a vehicle traveling ahead of the own vehicle, and the like are three-dimensionally recognized.

The driver monitoring system 30 includes a driver monitoring camera 31 configured to capture an image of a driver, an IPU 32 configured to perform image processing on the image captured by the driver monitoring camera 31, and an expression detector 33 configured to detect an expression centered on a driver's face based on the image of the driver processed by the IPU 32 for each of the acquired images.

Figure 2:
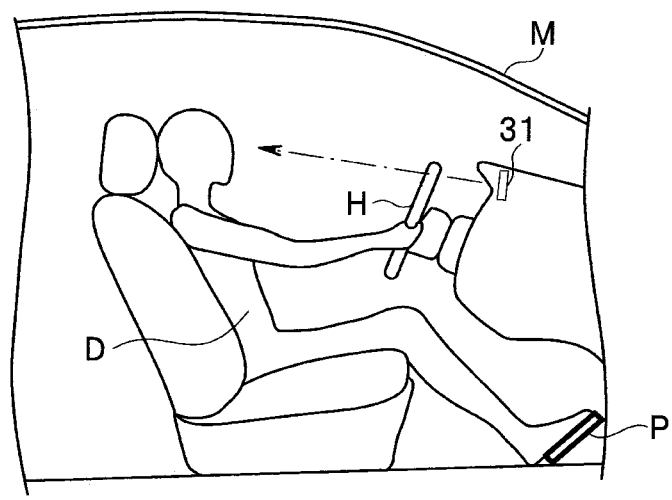
FIG. 2 is an explanatory diagram illustrating an arrangement of a driver monitoring camera.

FIG. 2 is an explanatory diagram illustrating an arrangement of the driver monitoring camera, and, for example, the driver monitoring camera 31 is installed on an instrument panel in front of the driver's seat on the own vehicle M. The driver monitoring camera 31 is set so as to capture an image from the front side of a driver D when the accelerator pedal P is operated. The image of the driver D captured by the driver monitoring camera 31 is processed by the IPU 32, and then transferred to the expression detector 33.

The expression detector 33 detects the expression of the driver D centered on the face of the driver D for each acquired image based on the image of the driver D. For example, the expression detector 33 detects a state of the face of the driver D (degree of opening of the pupil, eye gaze direction, openness of nostrils and mouth), a state of arms holding the steering wheel H and shoulders, and the like, as the expression of the driver D.

The braking/driving control unit 40 controls travel driving force generated by an electric motor or an internal combustion engine, and controls a traveling speed, switching between forward and reverse, braking of the own vehicle, and the like. For example, the braking/driving control unit 40 controls the operation state of the engine based on signals from various sensors for detecting the engine operation state and various pieces of control information acquired via the in-vehicle network, and controls a brake device for four-wheel (not illustrated) independent of the driver's brake operation, based on a brake switch, a four-wheel speed, a steering angle, a yaw rate, and other pieces of vehicle information. Further, the braking/driving control unit 40 calculates brake fluid pressure of each wheel based on the braking force for each wheel, and performs anti-lock brake control, side slip prevention control, and the like.

The steering control unit 50 controls the steering torque by an electric power steering (EPS) device 51 provided in the steering system based on, for example, a vehicle speed, a steering torque by a driver, a steering angle, a yaw rate, and other pieces of vehicle information. The control of the steering torque is performed as current control for the electric motor of the EPS device 51 configured to realize the target steering torque for matching the actual steering angle to the target steering angle. The EPS device 51 uses the target steering torque from the steering control unit 50 as command torque, and controls the driving current of the electric motor corresponding to the command torque by, for example, PID control.

The information notification unit 60 controls the output of an alarm when an abnormality occurs in various devices of the vehicle or for alerting a driver, and the output of various pieces of information to be presented to the driver. For example, warning and control information are presented by using at least one of a visual output such as a monitor, a display, an alarm lamp, or the like and an auditory output such as a speaker, a buzzer, or the like. The information notification unit 60 presents the control state during traveling of the own vehicle to the driver, and presents a driving state to the driver at that time when traveling control including a driving assist is suspended by a driver's operation.

In the vehicle control system 1 described above, when the driving assist switch 12 is turned on during traveling, the driving assist unit 10 executes various pieces of driving assist control based on the traveling environment in the traveling direction of the own vehicle detected by the camera unit 20. For example, the driving assist unit 10 executes, as the driving assist control, active lane keep control for maintaining the traveling position of the own vehicle in a lane, lane departure prevention control for preventing the own vehicle from departing outside the traveling lane, pre-crash brake control for avoiding a collision or reduce collision damage by predicting a collision risk, and adaptive cruise control (ACC) for automatically switching between following traveling and constant speed traveling according to a result of capturing a preceding vehicle, and the like.

Further, the driving assist unit 10 monitors the accelerator operation by the driver at a time of starting and traveling of the own vehicle, and when the rapid accelerator operation which causes rapid acceleration is performed, determines whether the rapid accelerator operation is due to the erroneous operation by the driver. When it is determined that the driver erroneously performs the rapid accelerator operation, the driving assist unit 10 suppresses the acceleration of the vehicle to secure safety, thereby avoiding an accident occurrence beforehand. To realize this, the driving assist unit 10 includes an acceleration state detector 11a, an expression sudden change determinator 11b, and an acceleration suppressor 11c.

The acceleration state detector 11a checks a change in the accelerator opening based on a signal from the accelerator sensor 14, and detects the acceleration state. For example, the acceleration state detector 11a calculates a change amount $\Delta\alpha$ of the accelerator opening $\alpha$ at every predetermined time, and compares the change amount $\Delta\alpha$ with a set opening $\alpha$set. When $\Delta\alpha<\alpha$set, the acceleration state detector 11a detects as a normal acceleration state in which the driver depresses the accelerator pedal relatively gently, and when $\Delta\alpha\geq\alpha$set, detects as a rapid acceleration state in which the driver depresses the accelerator pedal rapidly.

The expression sudden change determinator 11b monitors the expression of the driver detected by the expression detector 33 of the driver monitoring system 30 and determines whether the expression of the driver suddenly changes after rapid acceleration due to a rapid accelerator operation by the driver. For example, the expression sudden change determinator 11b constructs a database in which the expression of the driver is learned by inputting the driving state of the vehicle and the image of the driver to the neural network, or the like.

In the driver's expression database, expressions such as the state of the muscles of the driver's face, the pupil area, changes in the eye gaze direction, the state of the arms and shoulders, the state of the mouth, and the like in a normal acceleration state are recorded, and also the expression at the time of the rapid acceleration state are recorded, and the expression in the normal acceleration state and the expression in the rapid acceleration state are learned and identified.

For example, when the driver's expression corresponds to any one of the following expressions, the expression sudden change determinator 11b determines that the driver's expression is suddenly changed. In other words, the expression sudden change determinator 11b determines that the driver's expression is suddenly changed, based on the database of the driver's expression, in a case where driver's facial muscle stiffness, rapid enlargement of the pupil area, or eyes focusing on one spot is recognized, where body stiffness is recognized from the state of the arms and shoulders of the driver, and where it is recognized that the driver is panicking because the driver's pupil area increases and the mouth is widely opened.

When the camera unit 20 has not detected an object (obstacle) for which collision avoidance is required in the traveling direction of the own vehicle, and the expression sudden change determinator 11b determines that the driver's expression has suddenly changed immediately after detection of the rapid acceleration due to the driver's accelerator operation by the acceleration state detector 11a, the acceleration suppressor 11c determines that the driver has performed the accelerator operation erroneously, and executes acceleration suppression control for suppressing acceleration of the own vehicle. The acceleration suppression control is executed with respect to the rapid acceleration state at the time of starting the own vehicle from the stopped state or during the traveling of the own vehicle, via the braking/driving control unit 40, when it is determined that the driver's expression is suddenly changed after a lapse of a preset time immediately after the driver's depression on the accelerator pedal to perform rapid acceleration.

Figure 3:
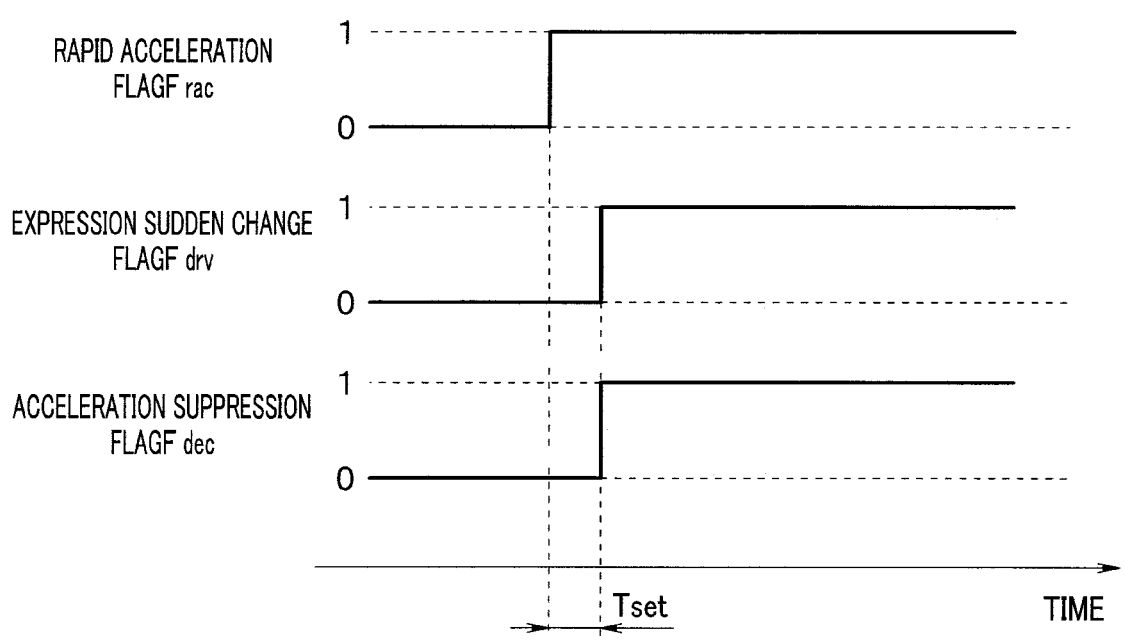
FIG. 3 is an explanatory diagram illustrating a control timing of acceleration suppression.

FIG. 3 is an explanatory diagram illustrating control timing of acceleration suppression. When the acceleration state detector 11a detects the rapid acceleration due to the driver's accelerator operation, the rapid acceleration flag Frac is turned on (Frac=1) as illustrated in FIG. 3. After a lapse of the preset time Tset immediately after turning on the rapid acceleration flag Frac, when the expression sudden change determinator 11b determines that the driver's expression has suddenly changed, the expression sudden change flag Fdrv is turned on (Fdrv=1).

Here, the preset time Tset is set such that control intervention for the acceleration suppression is performed as early as possible, taking into consideration the driver's reaction time from when the driver performs a rapid accelerator operation to when the driver notices an erroneous operation or feels an abnormality. For example, Tset is set to 1 to 2 sec.

When the rapid acceleration flag Frac and the expression sudden change flag Fdrv are both on in a state where no obstacle is detected ahead of the own vehicle, the acceleration suppressor 11c turns on the acceleration suppression flag Fdec (Fdec=1), and transmits the acceleration suppression flag Fdec to the braking/driving control unit 40. In the normal state where the acceleration suppression flag Fdec is off (Fdec=0), the braking/driving control unit 40 controls the driving force of the engine and the electric motor with predetermined characteristics according to the accelerator opening based on the signal from the accelerator sensor 14.

On the other hand, when the acceleration suppression flag Fdec is turned on, the braking/driving control unit 40 controls at least one of the driving force suppression control for controlling the driving force for the accelerator opening to be smaller than the normal driving force or the braking control, thereby suppressing the excessive acceleration of the own vehicle.

In this case, a degree of the acceleration suppression is adjusted depending on the traveling environment in the traveling direction of the own vehicle. For example, when an object for which collision avoidance is not required at a time of detection exists at a relatively far distance in the traveling direction of the own vehicle, the acceleration suppressor 11c reduces the driving force or strengthens the braking force as compared with a case where no object exists. Further, the degree of the acceleration suppression is also adjusted depending on the travelable space in the traveling direction of the own vehicle, and the degree of the acceleration suppression is increased as the travelable space becomes smaller. For example, when the own vehicle is stopped facing the sea or river, or when there is a risk of falling due to a cliff in front of the own vehicle, the degree of acceleration suppression is increased as compared with a case where there is no obstacle on the road ahead.

Figure 4:
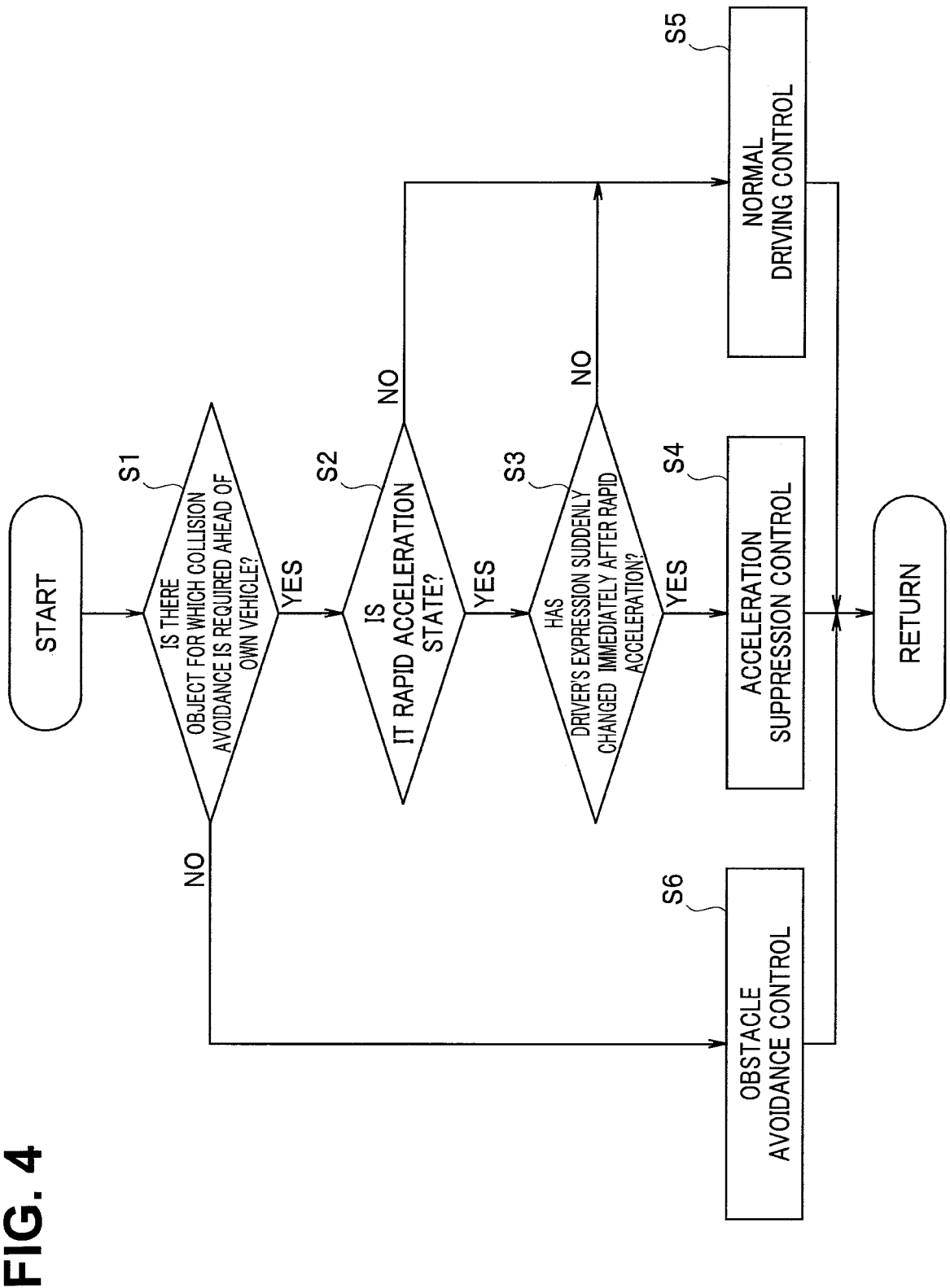
FIG. 4 is a flowchart of an acceleration suppression determination process.

Next, the operation related to the acceleration suppression of the vehicle control system 1 will be described with reference to a flowchart of an acceleration suppression determination process executed by the driving assist unit 10. FIG. 4 is the flowchart of the acceleration suppression determination process.

In the first step S1 of the acceleration suppression determination process, the driving assist unit 10 reads information from the camera unit 20 and confirms whether there is an object (obstacle) for which collision avoidance is required ahead of the own vehicle. When there is the obstacle ahead of the own vehicle, the process proceeds from step S1 to step S6 and the driving assist unit 10 instructs the braking/driving control unit 40 and the steering control unit 50 to execute obstacle avoidance control for avoiding the obstacle.

On the other hand, when there is no obstacle ahead of the own vehicle, the process proceeds from step S1 to step S2 and the driving assist unit 10 checks whether the own vehicle is in a rapid acceleration state by referring to the rapid acceleration flag Frac. As described above, the rapid acceleration flag Frac is a flag that is turned on when the rapid acceleration state is detected from the amount of change in the accelerator opening calculated at every predetermined time.

When it is determined in step S2 that the own vehicle is not in the rapid acceleration state (Frac=0), the process proceeds to step S5 and the driving assist unit 10 instructs the braking/driving control unit 40 and the steering control unit 50 to execute the normal driving control.

On the other hand, when it is determined in step S2 that the own vehicle is in the rapid acceleration state (Frac=1), the driving assist unit 10 further refers to the expression sudden change flag Fdrv in step S3 to determine whether the driver's expression has suddenly changed immediately after the rapid acceleration. As described above, the expression sudden change flag Fdrv is a flag that is turned on when it is determined that the driver's expression detected by the driver monitoring system 30 has suddenly changed after the lapse of the preset time Tset (e.g., Tset=1 to 2 sec) immediately after the determination of the rapid acceleration.

When the driver's expression has not changed immediately after the rapid acceleration (Frac=1 and Fdrv=0), the process proceeds from step S3 to step S5 and the driving assist unit 10 instructs to execute the normal driving control. On the other hand, when the driver's expression has suddenly changed immediately after the rapid acceleration (Frac=1 and Fdrv=1), the process proceeds from step S3 to step S4 and the driving assist unit 10 instructs the braking/driving control unit 40 to execute the acceleration suppression control. The acceleration suppression control is executed as at least one of the driving force control or the brake control.

As described above, in the embodiment, when it is determined that no obstacle is detected in the traveling direction of the own vehicle and the driver's expression has suddenly changed immediately after the detection of the rapid acceleration due to the driver's operation, the acceleration of the own vehicle is suppressed. Therefore, it is possible to prevent the own vehicle from being excessively accelerated due to the driver's erroneous operation, and it is possible to secure safety and prevent the accident occurrence beforehand.

In particular, when the own vehicle is stopped facing at the sea or river where there is no three-dimensional object in front, or when the own vehicle is stopped in front of the cliff or the like, where the front is a space, the rapid acceleration due to the driver's erroneous operation can be effectively suppressed. In addition, when no obstacle is detected in the traveling direction of the own vehicle, the rapid acceleration by the normal driving operation is permitted, so that the driver does not feel uncomfortable.

Each of the driving assist unit 10 and the driver monitoring system 30 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assist unit 10 including the acceleration state detector 11*a*, the expression sudden change determinator 11*b*, and the acceleration suppressor 11*c*. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control system to be installed in a vehicle, the vehicle control system comprising:
 a first sensor configured to detect a traveling environment ahead of the vehicle;
 a second sensor configured to detect that a driver of the vehicle has depressed an accelerator pedal for a predetermined depression amount;
 a driver state monitor configured to monitor a state of the driver on a basis of a captured driver's image and detect an expression on a driver's face; and
 circuitry configured to:
  determine, based on the detected traveling environment ahead of the vehicle, that an obstacle for which collision avoidance is required is absent ahead of the vehicle; and
  while the obstacle for which the collision avoidance is required is absent ahead of the vehicle, i) detect the driver of the vehicle depressing the accelerator pedal for the predetermined depression amount, ii) determine that the driver of the vehicle has erroneously depressed the accelerator pedal based on a change in the expression of the driver's face before and after detecting the depression of the accelerator pedal for the predetermined depression amount such that the expression of the driver's face after detecting the depression of the accelerator pedal for the predetermined depression amount indicates that the driver is panicking, and iii) in response to 1) detecting the driver depressing the accelerator pedal for the predetermined depression amount and 2) determining that the driver has erroneously depressed the accelerator pedal, execute acceleration suppression control that suppresses a first acceleration rate of the vehicle corresponding to the predetermined depression amount of the accelerator pedal to a second acceleration rate of the vehicle lower than the first acceleration such that the vehicle does not accelerate according to the predetermined depression amount of the accelerator pedal.

2. The vehicle control system according to claim 1, wherein the circuitry determines the expression on the driver's face changed to the expression where the driver is recognized as being in the panic when any one of rigidity of the driver's face and eyes focusing on one spot.

3. The vehicle control system according to claim 1, wherein the predetermined time period is set to one to two seconds.

4. A vehicle control system to be installed in a vehicle, the vehicle control system comprising:
 a first sensor configured to detect a traveling environment ahead of the vehicle;
 a second sensor configured to detect that a driver of the vehicle has depressed an accelerator pedal for a predetermined depression amount;
 a driver state monitor configured to monitor a state of the driver on a basis of a captured driver's image and detect an expression on a driver's face; and
 one or more processors configured to:
  determine, based on the detected traveling environment ahead of the vehicle, that an obstacle for which collision avoidance is required is absent ahead of the vehicle;
  while the obstacle for which the collision avoidance is required is absent ahead of the vehicle, i) detect the driver of the vehicle depressing the accelerator pedal for the predetermined depression amount, ii) determine that the driver of the vehicle has erroneously depressed the accelerator pedal based on a change in the expression of the driver's face before and after detecting the depression of the accelerator pedal for the predetermined depression amount such that the expression of the driver's face after detecting the depression of the accelerator pedal for the predetermined depression amount indicates that the driver is panicking, and iii) in response to 1) detecting the driver depressing the accelerator pedal for the predetermined depression amount and 2) determining that the driver has erroneously depressed the accelerator pedal, execute acceleration suppression control that suppresses a first acceleration rate of the vehicle corresponding to the predetermined depression amount of the accelerator pedal to a second acceleration rate of the vehicle lower than the first acceleration such that the vehicle does not accelerate according to the predetermined depression amount of the accelerator pedal.

5. The vehicle control system according to claim 4, wherein the one or more processors determine the expression on the driver's face changed to the expression where the driver is recognized as being in the panic when any one of rigidity of the driver's face and eyes focusing on one spot.

* * * * *